United States Patent [19]

Sorihashi et al.

[11] Patent Number: 5,220,477
[45] Date of Patent: Jun. 15, 1993

[54] CASSETTE TAPE-LOADING APPARATUS

[75] Inventors: Tomohide Sorihashi, Katsuta; Shigemitsu Higuchi, Fujisawa; Hideo Nishijima; Yuji Inaba, both of Katsuta, all of Japan

[73] Assignee: Hitachi, Ltd., Chiyoda, Japan

[21] Appl. No.: 668,127

[22] Filed: Mar. 12, 1991

[30] Foreign Application Priority Data

Mar. 14, 1990 [JP] Japan ............................. 2-60966

[51] Int. Cl.⁵ .......................................... G11B 15/665
[52] U.S. Cl. ............................................. 360/71; 360/85
[58] Field of Search ............... 360/71, 85; 242/191, 242/186, 199, 200

[56] References Cited

FOREIGN PATENT DOCUMENTS 62-239455 10/1987 Japan .
63-9055 1/1988 Japan .
63-224063 9/1988 Japan .

Primary Examiner—Joseph L. Dixon
Assistant Examiner—David L. Robertson
Attorney, Agent, or Firm—Antonelli, Terry, Stout & Kraus

[57] ABSTRACT

A cassette tape-loading apparatus applied to a magnetic recording and reproducing apparatus using a cassette tape comprises a device for determining the amount of rotation of supply and take-up reels, a device for detecting the rotational direction of the reels, and a device for detecting the amount of tape drawn out of the cassette. Before loading the cassette tape, the ratio of winding diameter between the supply and take-up reels is computed, and the result is used to set the torque of the reel-driving motors and start the loading operation. At the time of loading, on the other hand, the amount of rotation of the two reels is determined, and the winding diameters of the reels computed from the winding diameter ratio and the amount of drawn-out tape thereby to set a proper tension of the magnetic tape. Since the tension applied to the magnetic tape and the torques of the reel motors are set in accordance with the winding diameter ratio and the winding diameters, magnetic tape of substantially equal amount is drawn out of each of the two reels, with the result that the magnetic tape is not subjected to an abnormal tension, thereby making possible a stable cassette tape-loading operation without damaging the tape or displacing the tape position.

8 Claims, 9 Drawing Sheets

CASSETTE TAPE-LOADING APPARATUS

BACKGROUND OF THE INVENTION

The present invention relates to a cassette tape-loading apparatus suitable for a magnetic recording and reproducing system using a cassette tape.

A magnetic recording and reproducing system for recording and reproducing a signal by the use of a cassette tape uses a mechanism for drawing a magnetic tape out of a tape cassette and loading it on a predetermined tape running path around a rotative cylinder.

In conventional cassette tape-loading apparatuses, in order to prevent the magnetic tape from falling off a predetermined tape running path at the time of loading, a predetermined torque is applied to reel motors for rotating a supply reel and a take-up reel and giving a tension to the magnetic tape in the loading process.

Also, in a tape-loading apparatus disclosed in JP-A-63-9055, the rotational speed of each reel motor is detected at the time of loading a tape, and the torques applied to the reel motors are regulated in accordance with variations in rotational speed.

Specifically, the rotational speed of the reel motor for driving a reel on which the tape is wound is compared with a reference speed, so that (1) when the rotational speed of the reel motor is higher than the reference speed, torque setting means is used to apply a torque corresponding to a predetermined tension to the reel motor in accordance with the loading or unloading mode, whereas (2) when the rotational speed of the reel motor is lower than the reference speed, the torque is applied by a speed loop circuit to attain the reference speed.

In this way, the damage to the tape due to the tape guide and the like is alleviated on the one hand while improving the tape-positioning accuracy on the other hand in the tape loading and unloading operations.

In the above-described conventional tape-loading apparatuses, however, no consideration is given to the amount of winding of the magnetic tape on the supply and take-up reels, that is, the winding diameter (radius) of the supply and take-up reels, thereby posing many problems including the tape being damaged due to an abnormal tension applied thereto or coming off from a predetermined tape running path at the time of loading.

At the time of loading a tape in the prior art, the reel motors for driving the supply and take-up reels are supplied with the same torque. In the case where the supply and take-up reels have different winding diameters, therefore, the magnetic tape on a reel of smaller winding diameter is subjected to a tension larger than a predetermined level, while a tension smaller than the predetermined one is applied to the magnetic tape running on the reel of larger winding diameter. As a result, an excessive tension is liable to damage the tape, cause the tape to loosen and come off the predetermined running path or cause the tape to be damaged by the edge of the tape guide. The imbalance in tension between supply and take-up reels, on the other hand, causes the magnetic tape to run in one direction, so that the repetition of the loading and unloading operations of the magnetic tape may lead to the problem of the recording or reproducing position greatly displaced on the magnetic tape. Even when the rotational speeds of the reels are detected and the torques to the reel motors regulated as described with reference to JP-A-63-9055 above, the linear speed of the magnetic tape drawn out of the supply or take-up reel is incapable of being controlled while the tape is being loaded, if the winding diameter is not known, and therefore it is impossible to prevent the unidirectional running of the magnetic tape. Nor is it possible to prevent an abnormal tension to apply a proper tension to the magnetic tape in the tape-loading operation.

A VTR for commercial use, such as a digital VTR of D-2 format ("Proposed American National Standards", SMPTE 244M, 255M, 246M, 247M, 248M) has three tape cassette sizes of "L", "M" and "S". Further, the "M"-sized tape cassette ranges from a minimum recording time of a few minutes to a maximum recording time of 94 minutes covering a wide range of reel-winding diameters. If the torque of a reel motor is set for the tape-loading operation without taking the winding diameter into consideration, therefore, the tape would be damaged very often.

SUMMARY OF THE INVENTION

The primary object of the present invention is to provide a cassette tape-loading apparatus in which even when the supply and take-up reels have different winding diameters, the reel motors for driving these reels are supplied with a proper torque, so that the tape is prevented from being damaged and the tape position from being displaced by the loading and unloading operations, thereby making possible stable recording and reproducing operations.

Another object of the present invention is to provide a cassette tape-loading apparatus which has a stable recording-reproduction characteristic with a smooth and stable head touch with the tape tension value after loading remaining unchanged with the winding diameter.

In order to achieve the above-mentioned objects, according to the present invention, there is provided a cassette tape-loading apparatus comprising means for determining the rotational amount of supply and take-up reels, means for detecting the direction of rotation of the reels, means for processing by computing the winding diameters of the supply and take-up reels and the ratio thereof between the two reels, and means for detecting the amount of tape drawn out of a tape cassette, wherein the tension applied to the magnetic tape and the torques of the reel motors are set in accordance with the winding diameters and the ratio thereof between the supply and take-up reels.

In a cassette tape-loading apparatus according to the present invention comprising the aforementioned means, the ratio of winding diameter between supply and take-up reels is calculated before loading, and the result of calculation is used to set the torques of the reel motors for driving the reels to start the loading operation. Also, at the time of the loading operation, the amount of rotation of the two reels is determined, and the ratio of winding diameter and the amount of magnetic tape drawn out are used to compute the winding diameters of the two reels, thereby setting a proper tension of the magnetic tape. As a result, the magnetic tape of equal length is drawn out of each of the two reels and therefore the magnetic tape is prevented from being subjected to an abnormal tension. A stable cassette tape-loading operation is thus performed without damaging the tape on the one hand nor causing a tape displacement on the other hand.

BRIEF DESCRIPTION OF THE DRAWINGS

Preferred embodiments of the present invention will now be described in conjunction with the accompanying drawings, in which:

FIGS. 2 to 4 are model diagrams for explaining the cassette tape-loading operation of a cassette tape-loading apparatus according to the present invention, in which FIG. 2 shows in particular the state before loading a cassette tape, FIG. 3 the state during the loading of a cassette tape, and FIG. 4 the state at the end of loading a cassette tape, respectively;

DESCRIPTION OF THE PREFERRED EMBODIMENTS

An embodiment of the present invention will be explained below with reference to the accompanying drawings.

Figure 1:
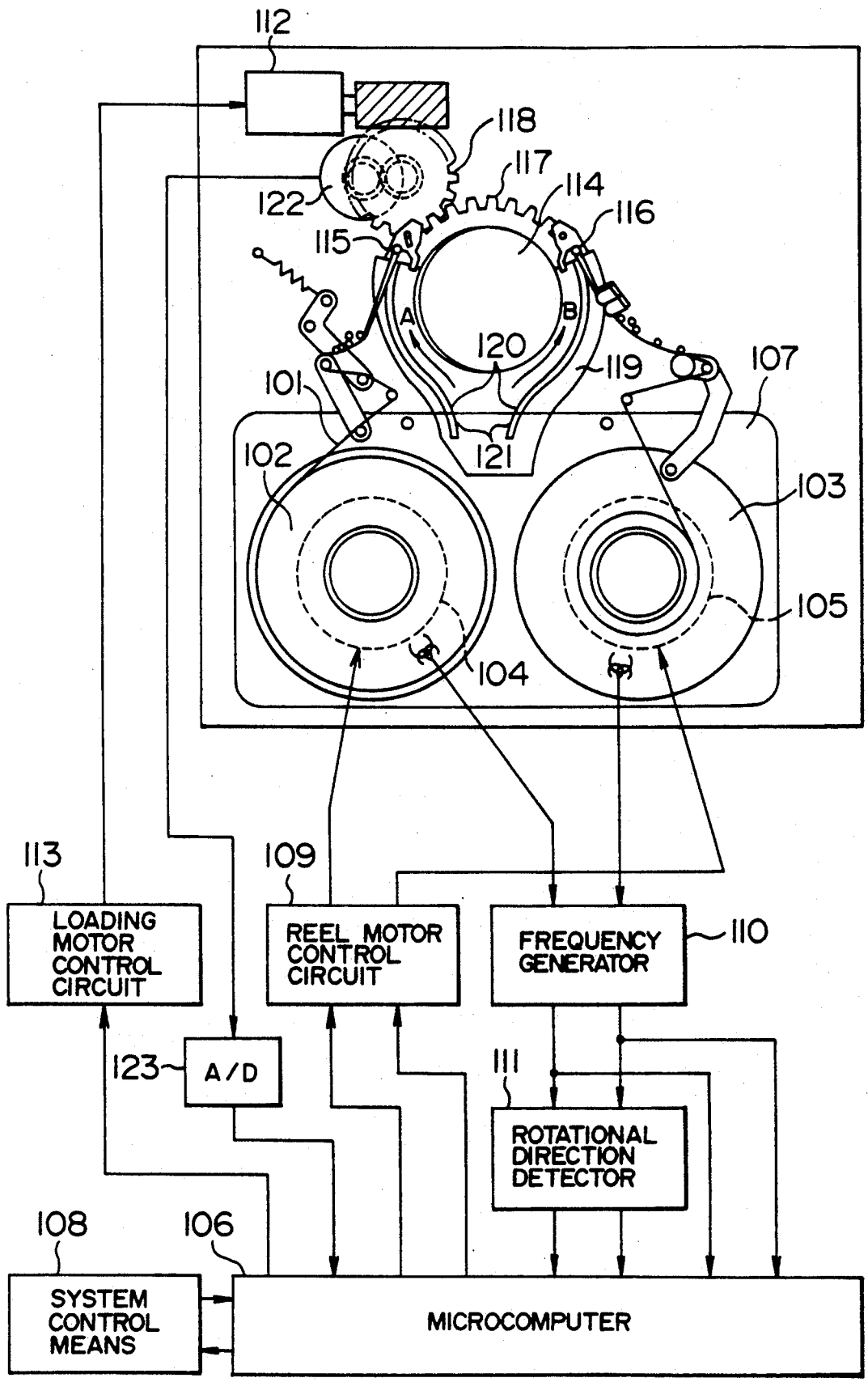
FIG. 1 is a diagram showing a block configuration of a cassette tape-loading apparatus according to a first embodiment of the present invention.
Figure 2:
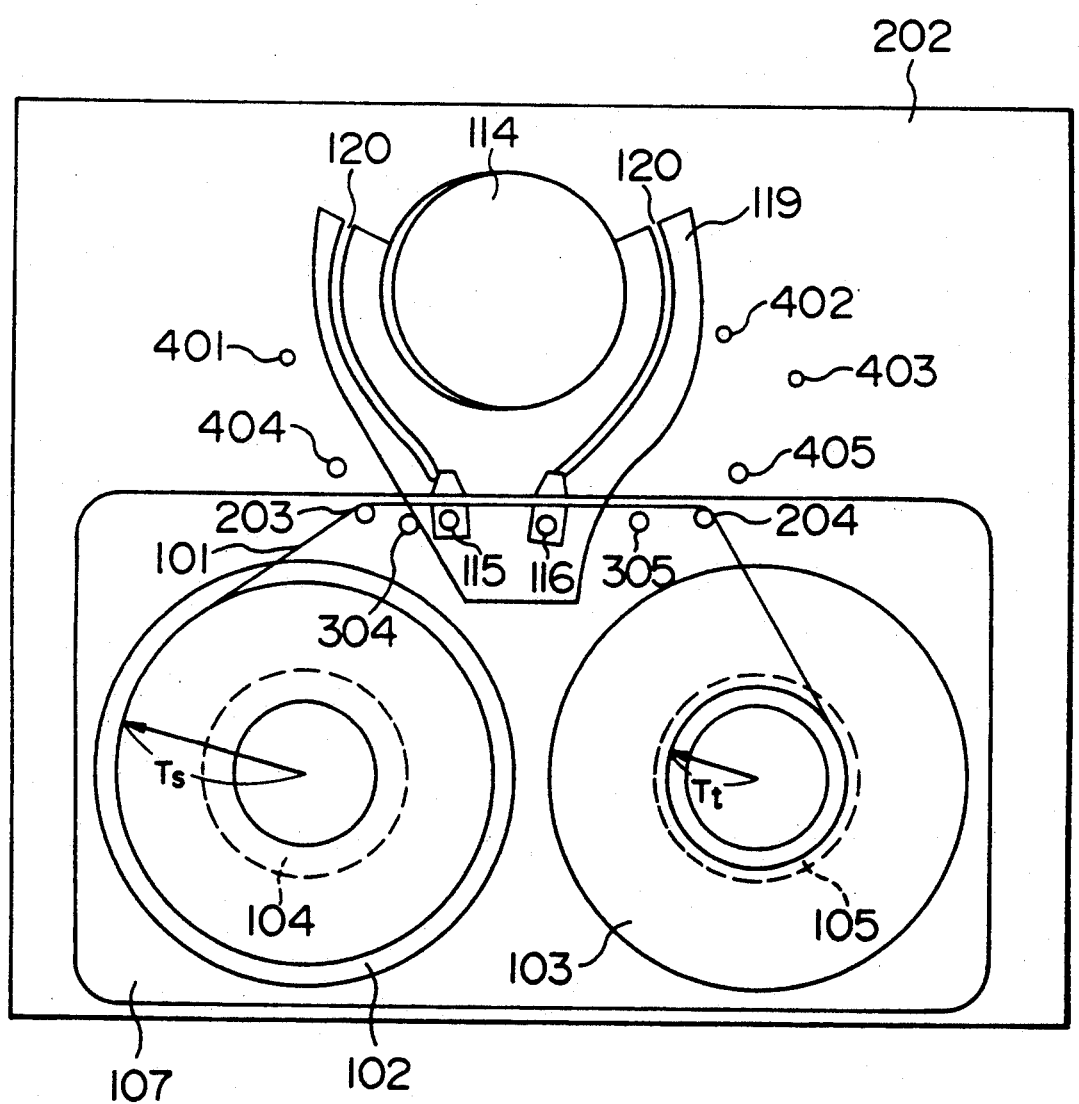
Figure 3:
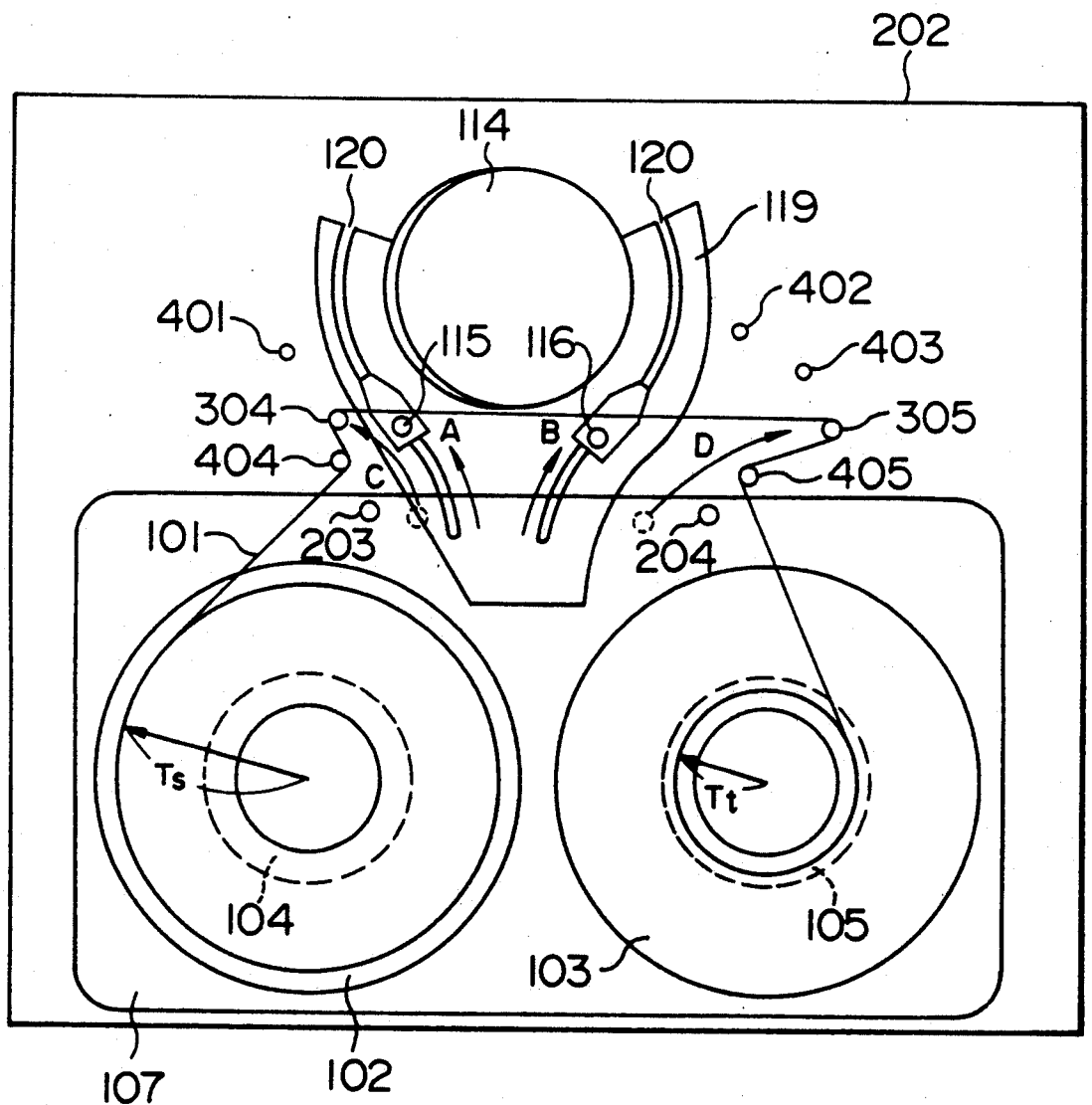
Figure 4:
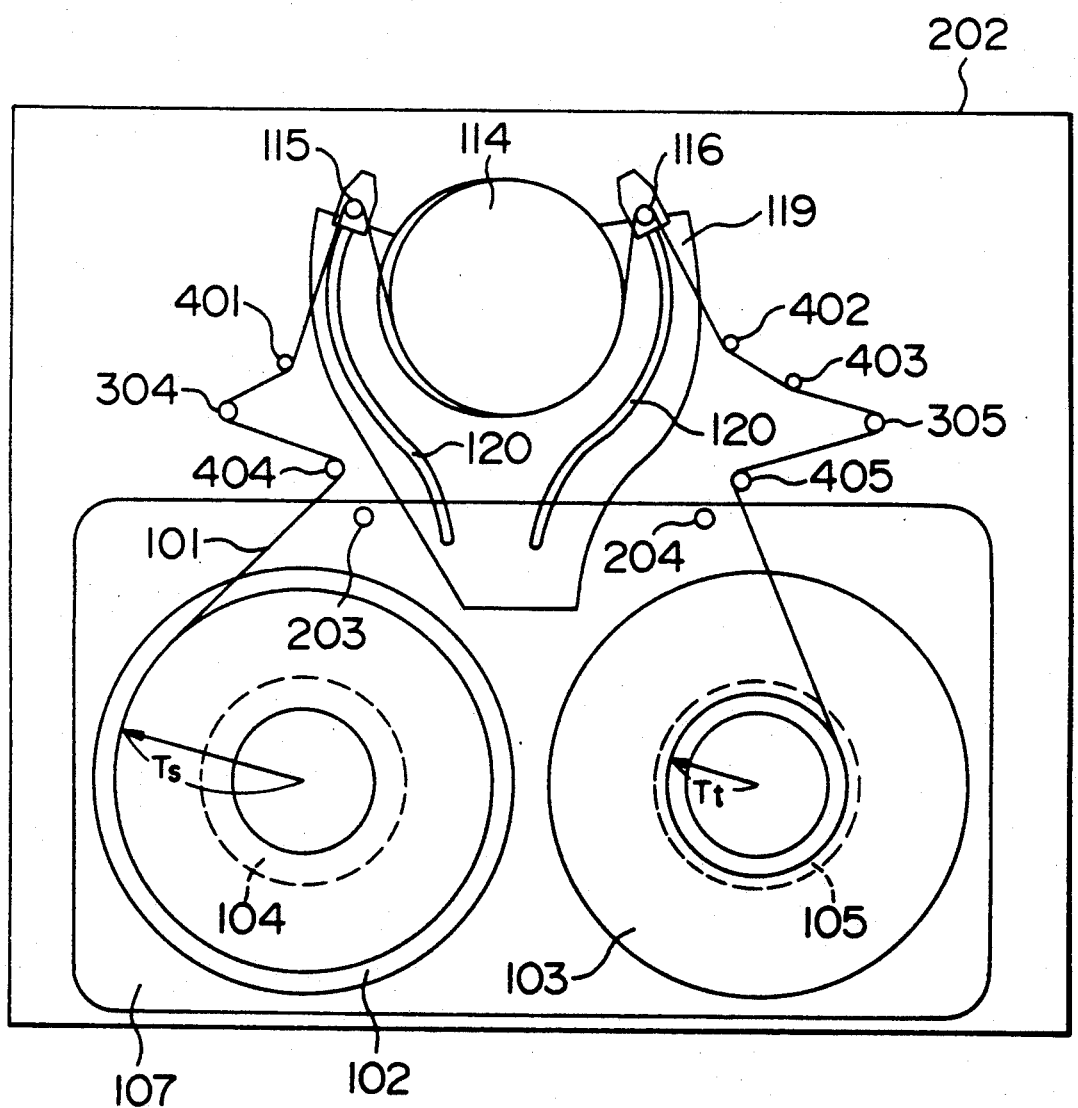
Figure 5:
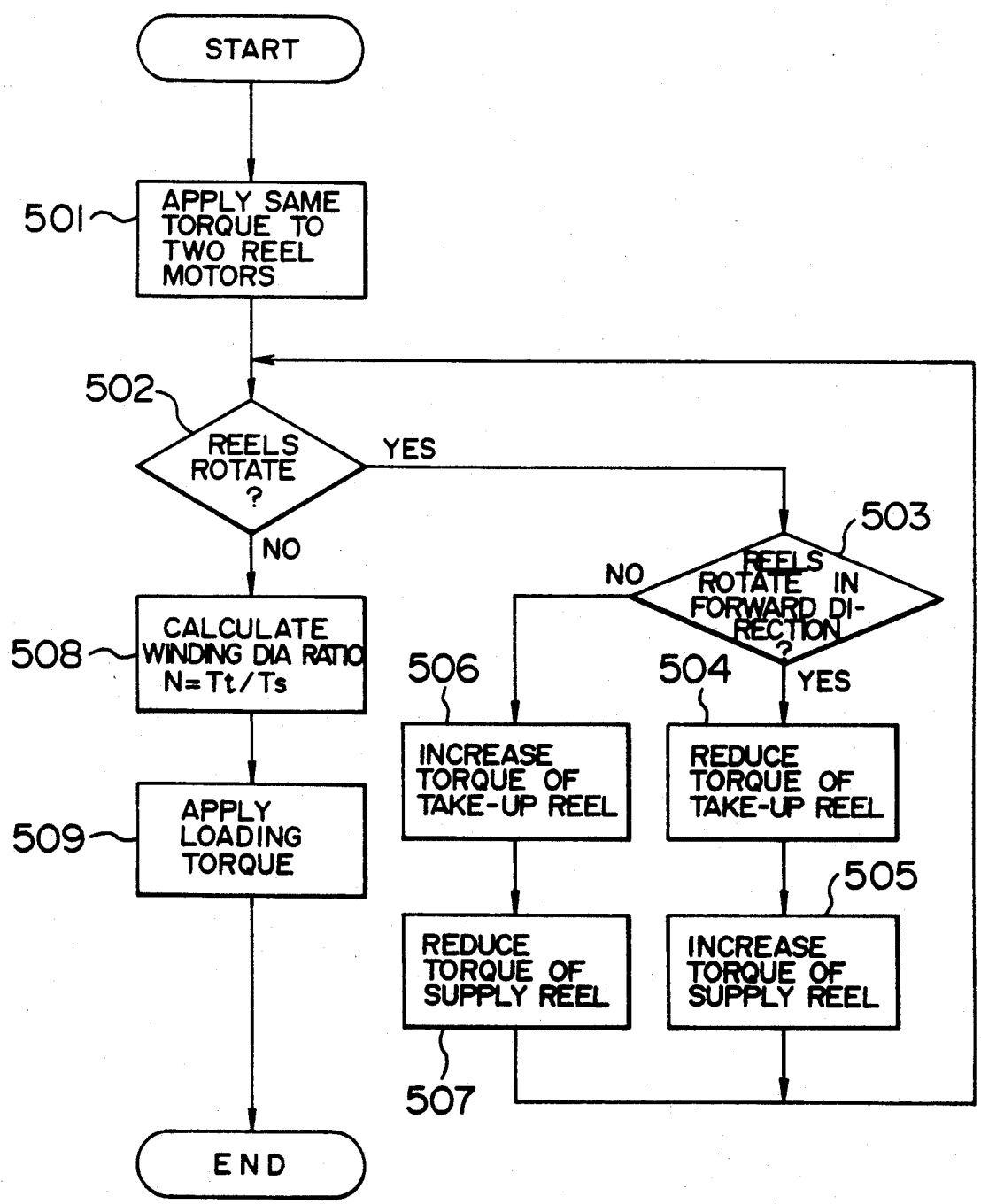
FIGS. 5 to 7 are flowcharts representing the process of setting the torques of the reel motors according to the present invention.
Figure 6:
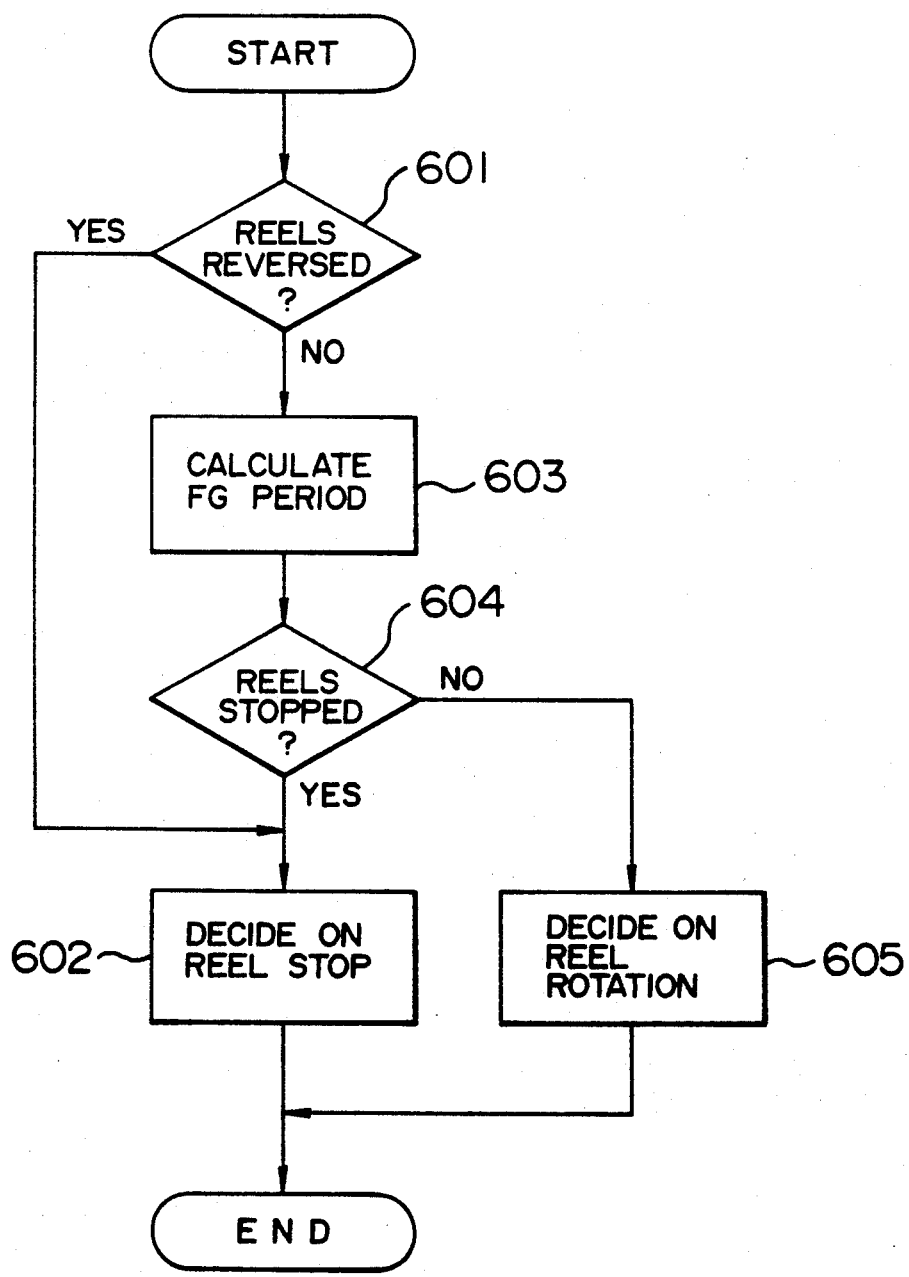
Figure 7:
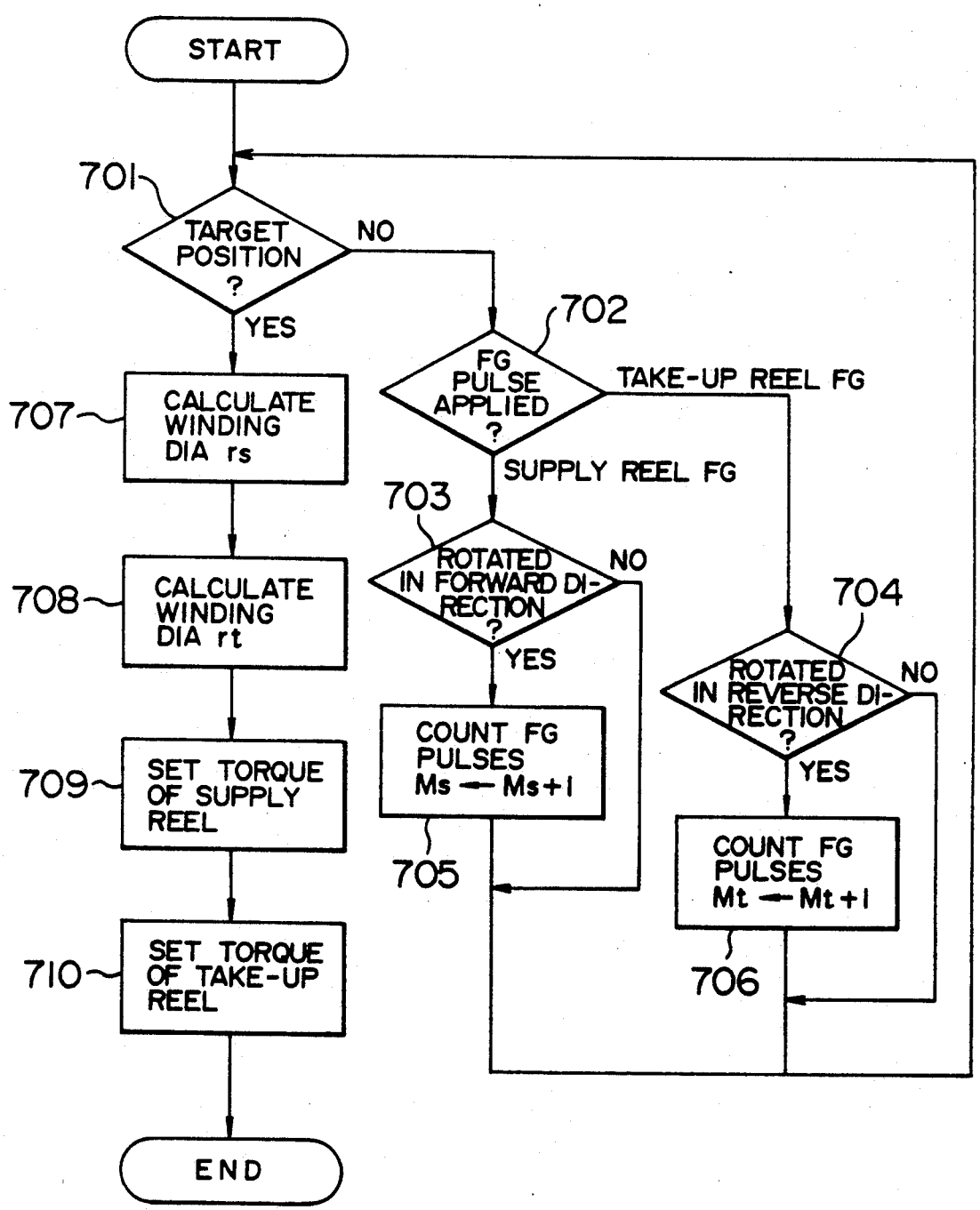

A block diagram of a cassette tape-loading apparatus according to the present invention is shown in FIG. 1, model diagrams for explaining the tape-loading operation in FIGS. 2, 3 and 4, and flowcharts representing the processes of setting the torques of reel motors in FIGS. 5, 6 and 7 respectively.

In FIG. 1, a supply reel 102 and a take-up reel 103 on which a magnetic tape 101 is wound are coupled to reel motors 104 and 105 indicated by dotted lines and supplied with a turning effort therefrom respectively. Reference numeral 106 designates a microcomputer providing means for processing by computing the amount of the magnetic tape wound on the supply and take-up reels, that is, the winding diameters thereof.

The supply reel 102 and the take-up reel 103 are contained in a tape cassette 107. Numeral 108 designates system control means for issuing a command for the tape-loading operation to the microcomputer 106. The reel motors 104, 105 are driven for rotation by a reel motor control circuit 109 in response to a control signal from the microcomputer 106. Numeral 110 designates a frequency generator for producing double-phase frequency generator (FG) pulses having phases different by 90 degree from each other in accordance with the revolutions of the reel motors 104, 105. The double-phase FG pulses having phases 90 degree different from each other produced from the frequency oscillator 110 are applied to a rotational direction detector 111, in which the phases are compared with each other to determine the rotational directions of the reel motors 104, 105. The FG pulses and the rotational direction signals associated with the reel motors 104, 105 are applied to the microcomputer 106. As a result, the microcomputer 106 is capable of computing the amount of rotation of the supply and take-up reels 104, 105.

Numeral 112 designates a loading motor which is driven by a loading motor control circuit 113 in response to a control signal from the microcomputer 106. FIG. 1 represents a state in which the magnetic tape 101 is loaded, that is, a state in which it is wound along a predetermined tape running path around a cylinder 114. Guide pins 115, 116 for holding the magnetic tape 101 are coupled to the loading motor 112 through loading gears 117, 118. In the process of loading the tape, the loading motor 112 is driven in such a manner that the guide pins 115, 116 are urged in the directions of arrows A and B along slots 120 respectively of a guide plate 119 from a loading start position 121 shown in FIG. 1. The output of a potentiometer 122 coupled to the loading gear 118 is applied through an A/D converter 123 to the microcomputer 106. The detection of the rotational angle of the loading gear 117 by the potentiometer 122 permits the detection of the positions of the guide pins 115, 116 in the process of cassette tape loading. Also, the amount (length) of the magnetic tape drawn out from the tape cassette 107 is determined by the positions of the guide pins 115, 116 at the time of tape loading.

The operation of loading a cassette tape according to the present invention will be explained with reference to FIGS. 2, 3 and 4.

FIG. 2 shows the state before loading a cassette tape. Numeral 202 designates a base of the cassette tape-loading apparatus. The tape cassette 107 has built therein a supply reel 102 and a take-up reel 103 with each of the ends of the magnetic tape 101 wound thereon respectively. The magnetic tape 101 is tensioned by pins 203, 204 in the tape cassette 107. FIG. 3 shows a state in the middle of loading operation. The loading motor 112 is driven in such a manner that the guide pins 115, 116 are moved along slots 120. Also, the guide pins 304, 305 are driven along the directions of arrows C, D respectively shown in FIG. 3 thereby to draw the magnetic tape 101 out of the tape cassette 107. FIG. 4 shows the state at the end of a cassette tape-loading operation, in which the magnetic tape 101 is wound around the cylinder 114 carrying a magnetic head mounted thereon ready for recording and reproducing. Numerals 401, 402, 403, 404, 405 designate fixed guides.

The process of controlling the cassette tape-loading operation by the microcomputer 106 will be explained below with reference to FIGS. 2, 3, 4 and the flowcharts of FIGS. 5, 6, 7.

In the state before loading a cassette tape shown in FIG. 2, the same torque is set to the supply reel motor 104 and the take-up reel motor 105 to drive the supply reel 102 and the take-up reel 103 for rotation, thereby determining the ratio of radius, that is, the ratio N of winding diameter between the portions of the magnetic tape 101 wound on the supply reel 102 and the take-up reel 103 respectively.

The process of determining this ratio N of winding diameter will be explained below with reference to the flowchart shown in FIG. 5.

First, as explained above, the same torque is applied to the reel motors 104, 105 on the supply and take-up reel sides at step 501. The torque is applied in such a manner that the turning effort in counterclockwise direction is caused in the supply reel motor 104 and in clockwise direction in the take-up reel motor 105 as viewed in FIG. 2. Then, at step 502, it is decided whether the supply reel 102 and the take-up reel 103 are rotating or not. If both the reels 102, 103 are rotating, it indicates that there is a difference in winding diameter between the supply reel 102 and the take-up reel 103, with the result that the tension of the magnetic tape 101 is unbalanced. In such a case, the torque is adjusted to stop the rotation of the reels by following the steps that will be mentioned. Specifically, at step 503, the rotational directions of the supply reel 102 and the take-up reel 103 are determined. The rotational directions of the two reels are detected by a rotational direction detector 111 by use of an FG pulse as shown in FIG. 1 and are applied to the microcomputer 106. Assume that the clockwise direction is the forward direction of rotation of the reels as viewed in FIG. 2. If it is decided that the reels are rotating in the forward direction at step 503, it indicates that the tape tension on the take-up reel side is greater. In such a case, the torque of the reel motor 105 on the take-up reel side is reduced and that of the reel motor 104 on the supply reel side increased (steps 504 and 505). In this way, the tension imbalance is dampened to stop the two reels. In the case where the two reels are rotating in reverse direction, by contrast, it indicates that the tape tension on the supply reel side is greater. In such a case, as shown at steps 506 and 507, the torque of the reel motor 105 on the take-up reel side is increased, while that of the reel motor 104 on the supply reel side is reduced. These control processes are continued until it is decided that the reels have come to a stop at step 502. In the case where it is decided at step 502 that the reels have stopped, the microcomputer 106 computes the winding diameter ratio N (step 508).

Since the reels are stationary, the tape tensions Fs and Ft of the supply and take-up reels are equal to each other, and therefore the winding diameter ratio N may be determined by equations (1) to (3) as shown below.

Specifically, in view of the fact that

*Torque = Tension × Winding diameter,*

$$Tt = Ft \cdot rt \tag{1}$$

$$Ts = Fs \cdot rs \tag{2}$$

$$N = rt/rs = (Tt/Ft)/(Ts/Fs) = Tt/Ts \tag{3}$$

where
rt: Winding diameter of take-up reel,
rs: Winding diameter of supply reel,
Tt: Torque of take-up reel, and
Ts: Torque of supply reel Now, a method of deciding whether the reels are rotating or stationary at step 502 shown in FIG. 5 will be explained with reference to FIG. 6.

In FIG. 6, it is decided whether the rotational direction of the reels has changed from forward to reverse or the other way at step 601. In view of the fact that the rotational direction of the reels is detected as shown in FIG. 5 to increase or decrease the torques of the reel motors 104, 105 for stop control, the reels are not stopped completely but may repeat the forward or reverse rotations without coming to a complete stop. In the case where step 601 has decided that the reels have reversed, therefore, it is decided (at step 602) that the reels have stopped. In order to prevent the repetitive high-speed forward and reverse rotations by sufficiently reducing the speed before a stop, it is necessary to reduce the amount of torque increase or decrease at steps 504, 505 or 506, 507 shown in FIG. 5. If it is decided that the reels are not reversed at step 601, the period of the FG pulse of the reel motors 104, 105 is computed at step 603. Then at step 604, it is decided whether the period of the FG pulse is sufficiently long, that is, whether the reel speed is sufficiently low to decide that they have come to a stop.

In the manner mentioned above, the ratio of winding diameter between the supply reel 102 and the take-up reel 103 is computed by the microcomputer 106 by the processes shown in FIGS. 5 and 6 before the cassette tape is loaded, thereby making it possible to apply a predetermined torque to the reel motors 104, 105.

In the case where the result of computation of the winding diameter ratio is abnormal, that is, where the result is higher than a possible maximum value or lower than a possible minimum value of the winding diameter ratio, then the steps shown in FIG. 5 may be repeated. As an alternative, if the result of computation exceeds a possible maximum value of winding diameter ratio, the actual winding diameter ratio may be set to the particular maximum value, while if the result of computation is lower than a possible minimum value, the actual winding diameter ratio may be determined at the particular minimum value.

Now, explanation will be made about a method of controlling the cassette tape-loading operation and the process of determining the winding diameters of the supply reel 102 and the take-up 103.

In response to a command for driving from the microcomputer 106, the loading motor 112 starts the loading operation of the guide pins 115, 116 and guide pins 304, 305, so that the magnetic tape 101 is drawn out of the tape cassette 107. As described above, the winding diameter ratio is determined and torques applied to the reel motors 104, 105 in such a manner as to subject the magnetic tape on the supply and take-up reel sides to the same tension. For this reason, the magnetic tape 101 is drawn out in equal amount from the supply reel 102 and the take-up reel 103 in the tape cassette 107. As a result, the magnetic tape is prevented from being damaged under an excessive tension or from coming off the tape running path due to the lack of tension which otherwise might occur.

The winding diameters of the supply reel 102 and the take-up reel 103 are determined from the winding diameter ratio calculated by determining the amount of rotation of the supply reel 102 and the take-up reel 103 and the length of the magnetic tape 101 drawn out of the tape cassette 107 at the time of loading.

The length of the magnetic tape drawn out of the tape cassette 107 is the sum of the lengths of the magnetic tape pulled out of the supply reel 102 and the take-up reel 103 with the movement of the guide pins 115, 116. The length of the magnetic tape drawn out of the tape cassette 107, which is dependent on the structure of the cassette loading apparatus and is determined by measurement or calculation, may be conveniently stored in a ROM as a data associated with each position of the guide pins 115, 116.

The winding diameters of the supply reel 102 and the take-up reel 103 are desirably determined immediately after starting loading. The calculation of the winding diameter, however, requires data on the amount of rotation of the supply reel 102 and the take-up reel 103, and to assure a sufficient accuracy of winding diameter calculation, the guide pins 115, 116 are required to be moved to a position where a sufficient amount of rotation is secured.

A method of calculating the winding diameter will be explained with reference to a case shown in FIG. 3 where approximately one third of the loading process has been finished as a target positions for calculation of the winding diameter.

The loading operation is started from the state before loading shown in FIG. 2, and the amount of rotation of the supply reel 102 and the take-up reel 103 is determined up to the target position shown in FIG. 3. Whether the target position has been reached by the guide pins 115, 116 is determined by the output of the potentiometer 122 applied to the microcomputer 106.

The computation process of the winding diameter by the microcomputer 106 will be explained with reference to the flowchart of FIG. 7.

In FIG. 7, it is decided whether the guide pins 115, 116 have moved to the target position for calculating the winding diameter. The amount of rotation of the supply reel 102 and the take-up reel 103 before arrival at the target position is calculated. In determining the amount of rotation, the FG pulses of the reel motors 104, 105 are counted by interruption routine in the microcomputer 106 at the leading or trailing edge thereof. More specifically, step 702 decides whether the FG pulse applied to the microcomputer 106 is associated with the reel motor 104 on the supply reel side or the reel motor 105 on the take-up reel side, followed by steps 705 and 706 for counting the FG pulses Ms and Mt on the supply and take-up reel sides respectively. In the process, the FG pulses are desirably counted with the supply reel 102 rotating in forward direction and the take-up reel 103 in reverse direction while the magnetic tape 101 is drawn out of the two reels. Although the winding diameter ratio N is calculated and the torques set for the reel motors 104, 105 to assume a balanced tape tension before loading, the rotational direction is detected at steps 703 and 704 in order to prevent miscalculations of FG pulses due to the variations in reel rotation caused by the imbalance or the frictional load at the time of movement of the guide pins 115, 116 or 304, 305 in the process of loading.

The number of FG pulses before arrival at a target position is determined in the manner mentioned above whereby the winding diameter is computed at steps 707 and 708. The winding diameter rs of the supply reel 102 and the winding diameter rt of the take-up reel 103 are calculated by the equations shown below from the amount (length) L of the magnetic tape drawn out of the tape cassette 107 at the target position.

$$L = Ls + Lt \quad (4)$$

$$Ls = 2\pi rs \cdot \frac{Ms}{k} \quad (5)$$

$$Lt = 2\pi rt \cdot \frac{Mt}{k} \quad (6)$$

$$N = rt/rs \quad (7)$$

where
Ls: Amount of tape drawn out of the supply reel 102
Lt: Amount of tape drawn out of the take-up reel 103
N: Winding diameter ratio (value determined by calculation before loading)
k: Number of FG pulses upon one revolution of the reel motor
Ms: Number of FG pulses before target position of the supply reel
Mt: Number of FG pulses before target position of the take-up reel Putting the aforementioned equations into order, the winding diameters rs and rt are given as $$rs = \frac{k \cdot L}{2\pi} \cdot \frac{1}{Ms + N \cdot Mt} \quad (8)$$

$$rt = N \cdot rs \quad (9)$$

The winding diameters rs, rt are determined by the simultaneous equations (8) and (9), and a torque applied to the reel motors 104, 105 in such a way that a predetermined tape tension f is given to the magnetic tape 101 (steps 709 and 710).

In the process, the winding diameters rs and rt before loading may be safely considered the same in terms of accuracy as those during or after loading.

In that case, the torques Ts' and Tt' of the reel motors on the supply and take-up reel sides respectively are calculated from the equations below.

$$Ts' = f \cdot rs \quad (10)$$

$$Tt' = f \cdot rt \quad (11)$$

Apart from the foregoing explanation which is made about the computation of the winding diameter with a target position set at the point where about one third of the whole loading process is finished, the computation of the winding diameter may be done at any position of the loading process as long as the data is obtainable on the amount of rotation of the supply reel 102 and the take-up reel 103. Also, the winding diameter may be calculated for a plurality of positions of the guide pins 115, 116.

If the result of calculation of the winding diameter exceeds a possible maximum value, the actual winding diameter may be set to the particular maximum value, while if the result of calculation of the winding diameter is lower than a possible minimum value, on the other hand, the actual value of the winding diameter may be determined as the particular minimum value.

Further, if the result of computation is an abnormal value of the winding diameter as mentioned above, FG pulses of the reel motors 104, 105 may be counted again from the positions of the guide pins 115, 116 at the end of computation of the winding diameters, and the length of the magnetic tape 101 drawn out of the tape cassette 107 may be calculated from the output of the potentiometer 122 by an amount of movement of the guide pins 115, 116 from the positions thereof at the end of computation of the winding diameters for a repeated calculation of the winding diameters, in order to set the torques of the reel motors 104, 105.

Now, another embodiment of the present invention will be explained with reference to FIGS. 8 and 9.

Figure 8:
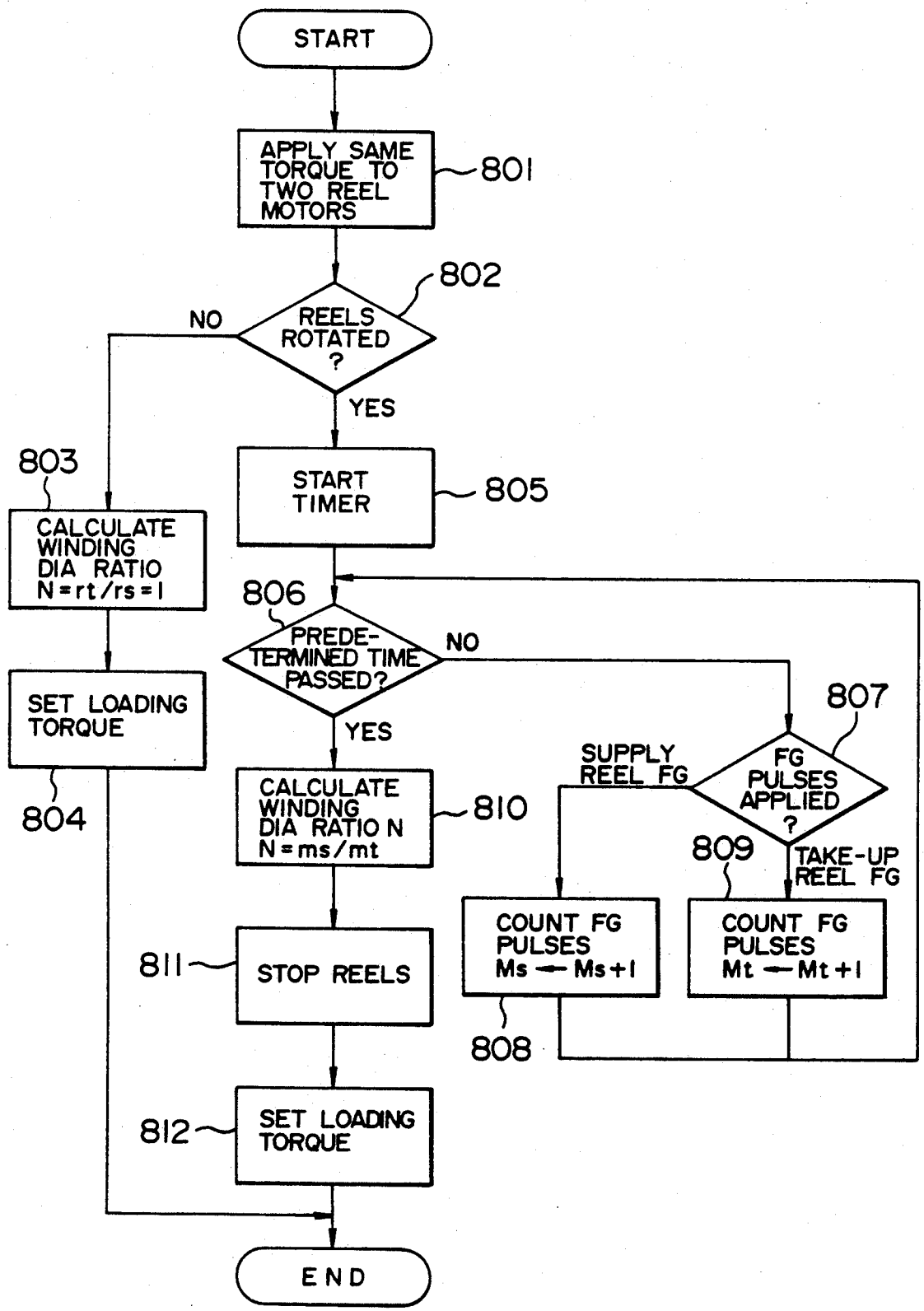
FIG. 8 is a flowchart representing a second embodiment of the present invention.

FIG. 8 is a flowchart representing the process of determining the winding diameter ratio before loading according to a second embodiment of the present invention.

In FIG. 8, the same torque is applied to the reel motors 104, 105 on the supply and take-up reel sides before loading at step 801. It is decided whether the reels are rotating or not at the next step 802. If the reels are stationary, it indicates that the supply reel 102 and the take-up reel 103 have the same winding diameter, so that the winding diameter ratio N=rt/rs is set to 1 at step 803, followed by step 804 for terminating the process by setting the same torque for the loading stage of the reel motors 104, 105. The decision at step 802 as to whether the reels are rotating or not is identical to that at the corresponding step shown in FIG. 6. In the case where the reels have different winding diameters and are rotating, the FG pulses of the reel motors 104, 105 on supply and take-up reel sides are counted (steps 807, 808, 809) for a predetermined length of time, say, 0.5 or one second (steps 805, 806). After the lapse of a predetermined length of time, the winding diameter ratio N is determined from the number of FG pulses at step 810.

The winding diameter ratio N is calculated from the equation below.

$$N = ms/mt \quad (12)$$

where
mt: Number of FG pulses of take-up reel
ms: Number of FG pulses of supply reel The reels are stopped at the next step 811. This step is executed by stopping applying torques to the reel motors 104, 105 or by applying the torques in such a manner as to cause a turning effort in the direction opposite to the actual direction of rotation. Then at step 812, the winding diameter ratio N thus computed is used to set the torques Ts, Tt of the reel motors 104, 105 on the supply and take-up reel sides respectively. The relationship between the torques Ts and Tt is given by the equation below from the winding diameter ratio N.

$$Tt = N \cdot Ts \quad (13)$$

The step 811 of stopping the reels may be excluded and replaced by setting a loading torque and starting the cassette-loading operation.

Figure 9:
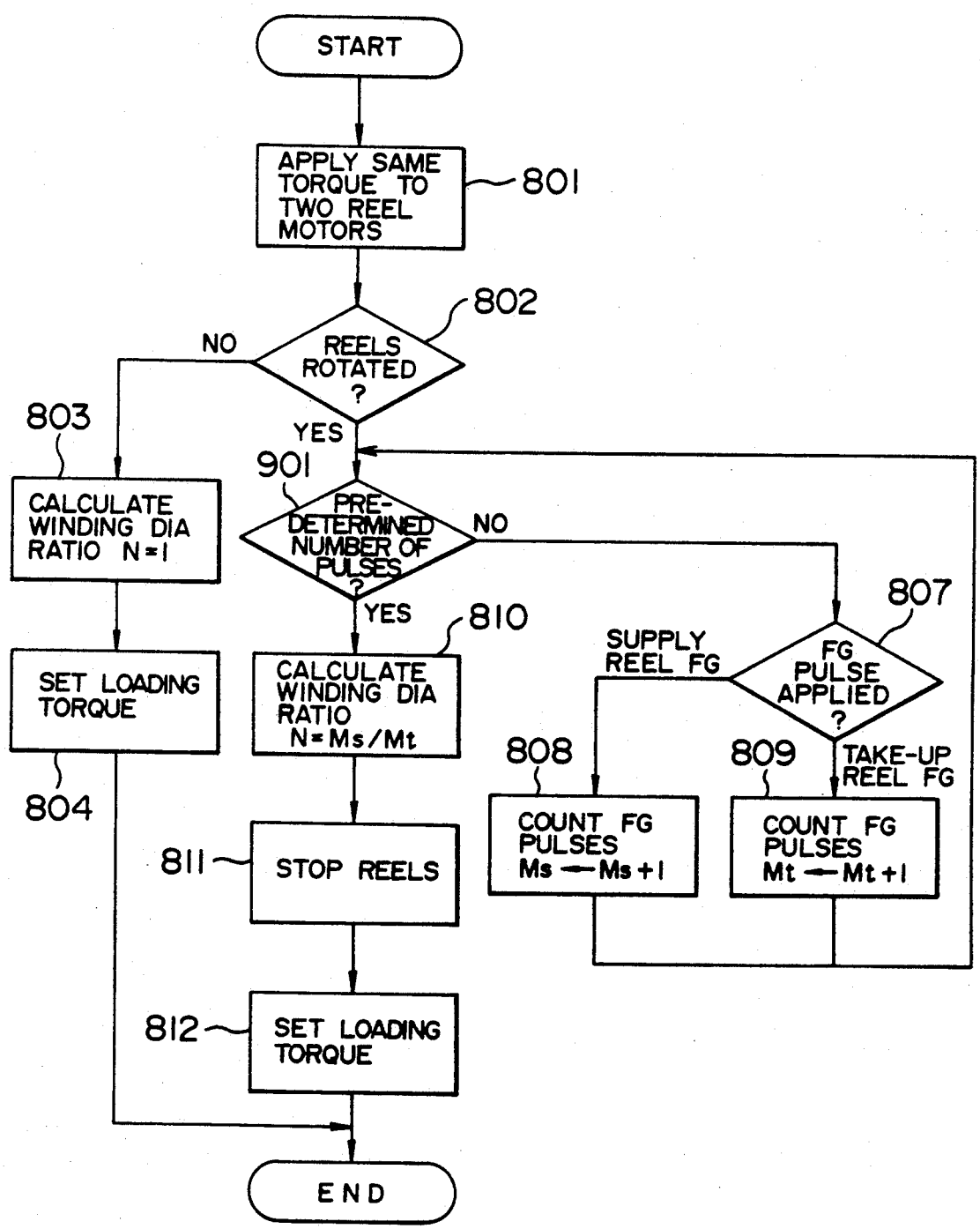
FIG. 9 is a flowchart representing a third embodiment of the present invention.

The process of determining the winding diameter ratio N according to a third embodiment of the present invention is shown in FIG. 9.

Unlike in the second embodiment shown in FIG. 8 where FG pulses are counted for a predetermined length of time, the third embodiment of FIG. 9 is such that FG pulses on one side continue to be counted until those on the other side reaches a predetermined number to determine a winding diameter ratio N. The process in FIG. 9, therefore, is identical to that in FIG. 8 except for step 901. At step 901, the FG pulses of the reel motor 104 on supply reel side or those of the reel motor 105 on take-up reel side are counted until one of them reaches a predetermined number, say, 50 or 100, thereby determining a winding diameter ratio N.

In this way, the same effect is obtained by using different embodiments of FIGS. 8 and 9 as in the preceding embodiments. As another alternative, in order to compute the winding diameter ratio and set the torques of the reel motors 104, 105 after the computation of a pre-loading winding diameter ratio, the amount of rotation of the reel 102 or 103 may be determined by counting the FG pulses of the reel motor 104 or 105 thereby to drive the reels by the same amount of rotation in opposite directions.

It will thus be understood from the foregoing description that according to the present invention, there is provided a cassette tape-loading apparatus comprising means for determining the amount of rotation of the supply reel 102 and the take-up reel 103, means for identifying the direction of rotation, means for computing the winding diameter ratio and the winding diameters, and means for applying a torque to the reel motors 104, 105, wherein the winding diameter ratio between the supply reel 102 and the take-up reel 103 is determined before loading and the winding diameters at the time of loading, thereby leading to the conspicuous advantages (1) to (2) described below.

(1) A proper torque is applied to the reel motors 104, 105 to subject the magnetic tape 101 to a proper tension, thereby making possible a stable cassette tape-loading operation free of damage to the magnetic tape 101. Specifically, in view of the fact that the winding diameter ratio is determined to set a torque for the reel motors before loading, the imbalance which otherwise might be caused in tape tension between the supply and take-up reels is eliminated, with the result that the magnetic tape 101 is capable of being drawn out of the two reels in equal amount, thereby preventing the tape from being damaged under an abnormal tension. Further, since the winding diameter is computed and a proper tension value set during the loading process, a stable loading operation is made possible.

(2) In view of the fact that the magnetic tape 101 is drawn out of the supply reel 102 and the take-up reel 103 in equal amount by application thereto of an equal torque, the recording and reproducing positions are not displaced by repeated loading and unloading operations and the tape tension remains unchanged after loading with the winding diameter, thereby providing superior recording and reproduction characteristics by stable and steady head touch.

We claim:

1. A cassette tape-loading apparatus comprising:
   two reel motors for rotating two reels with a magnetic tape wound thereon from within a tape cassette housing the magnetic tape;
   guide pins for drawing the magnetic tape out of the tape cassette and loading the magnetic tape onto a tape running path around a cylinder having magnetic heads mounted thereon;
   a loading motor for driving the guide pins;
   means for determining the amount of rotation of the reel motors;
   means for detecting the rotational directions of the reel motors;
   means for detecting the positions of the guide pins at the time of loading;
   means for applying a torque to the reel motors; and
   means for computing the amount and direction of rotation of the reel motors and the information on the position of the guide pins;
   wherein with the tape cassette mounted in the cassette tape-loading apparatus before loading, the ratio of winding diameter between the two reels is calculated, a torque of substantially the same ratio as the winding diameter ratio is applied to the two reel motors to start the cassette tape-loading operation, the winding diameters of the two reels are calculated by the computation means from the amount of rotation of the reel motors and the information on the position of the guide pins with the movement of the guide pins, and a torque of substantially the same ratio as the winding diameter ratio is applied to the two reel motors.

2. A cassette tape-loading apparatus according to claim 1, wherein before starting the cassette tape-loading operation, substantially the same torque is applied to the two reel motors, the rotational directions of the two reel motors are detected, and the torques applied to the two reel motors are changed in such a manner as to generate a turning effort in the direction opposite to the rotational direction of the reel motors thereby to stop the rotation of the two reels, so that the ratio of winding diameter between the two reels is determined and a torque of substantially the same ratio as the winding diameter ratio is applied to the two reel motors.

3. A cassette tape-loading apparatus according to claim 1, wherein in the case where the result of computing the winding diameter ratio is a value selected one of higher than a possible maximum value and lower than a possible minimum value, the process of computing the winding diameter ratio is repeated.

4. A cassette tape-loading apparatus according to claim 1, wherein in the case where the result of computing the winding diameter ratio is higher than a possible maximum value, the winding diameter ratio is set to the particular maximum value.

5. A cassette tape-loading apparatus according to claim 1, wherein in the case where the result of computing the winding diameter ratio is lower than a possible minimum value, the winding diameter ratio is set to the particular minimum value.

6. A cassette tape-loading apparatus according to claim 1, wherein after computation of the winding diameter ratio before loading, the amount by which the reels have rotated is determined by counting the frequency generator pulses from the reel motors in order to compute the winding diameter ratio and set the torque of the reel motors, thereby driving the reels in substantially the same amount in opposite directions.

7. A cassette tape-loading apparatus according to claim 1, wherein after computation of the winding diameter at the time of the cassette tape loading in the case when the winding diameter is higher than a possible maximum value, the winding diameter is set to the particular maximum value.

8. A cassette tape-loading apparatus according to claim 1, wherein after computation of the winding diameter at the time of the cassette tape loading, in the case when the winding diameter is lower than a possible minimum value, the winding diameter is set to the particular minimum value.

* * * * *